United States Patent [19]
Hile

[11] 3,766,536
[45] Oct. 16, 1973

[54] CATALYTIC CONVERTER MONITOR
[75] Inventor: John W. Hile, Birmingham, Mich.
[73] Assignee: General Motors Corporation, Detroit, Mich.
[22] Filed: Dec. 15, 1971
[21] Appl. No.: 208,166

[52] U.S. Cl............. 340/229, 23/288 F, 200/83 A
[51] Int. Cl. .......................... G08b 17/04, B01j 9/00
[58] Field of Search........................... 340/229, 227; 200/83 A, 83 R; 23/288 F

[56] References Cited
UNITED STATES PATENTS
2,493,351  1/1950  Jones................................... 340/229
2,421,149  5/1947  Segerstad.......................... 200/83 A
3,268,683  8/1966  Palmer............................... 200/83 A
2,582,483  1/1952  Hallerberg........................ 200/83 A
2,641,750  6/1953  Evans............................. 340/229 X
2,493,448  1/1950  Fehr................................ 340/229 X Primary Examiner—John W. Caldwell
Assistant Examiner—Scott F. Partridge
Attorney—Sidney Carter et al.

[57] ABSTRACT

Apparatus for continuously monitoring the activity of an automobile catalytic converter adapted to be mounted on the vehicle in combination with the converter comprising an enclosed fluid pressure sensing system wherein the average temperature of the catalytic element is sensed and a fluid pressure proportional thereto is placed in opposition across a flexible diaphragm to a fluid pressure proportional to the temperature of the treated gases passing from the catalytic converter. The flexible diaphragm carries indicator means operative when the pressure differential proportional to the temperature differential between the exiting gases and the element is below a predetermined pressure differential to indicate that the converter is operating below a predetermined level of activity. The predetermined pressure differential may be either zero or a negative value to indicate that the converter is inactive or a larger value to indicate that the converter is active but operating at a level of activity below minimum.

1 Claim, 1 Drawing Figure

PATENTED OCT 16 1973
3,766,536
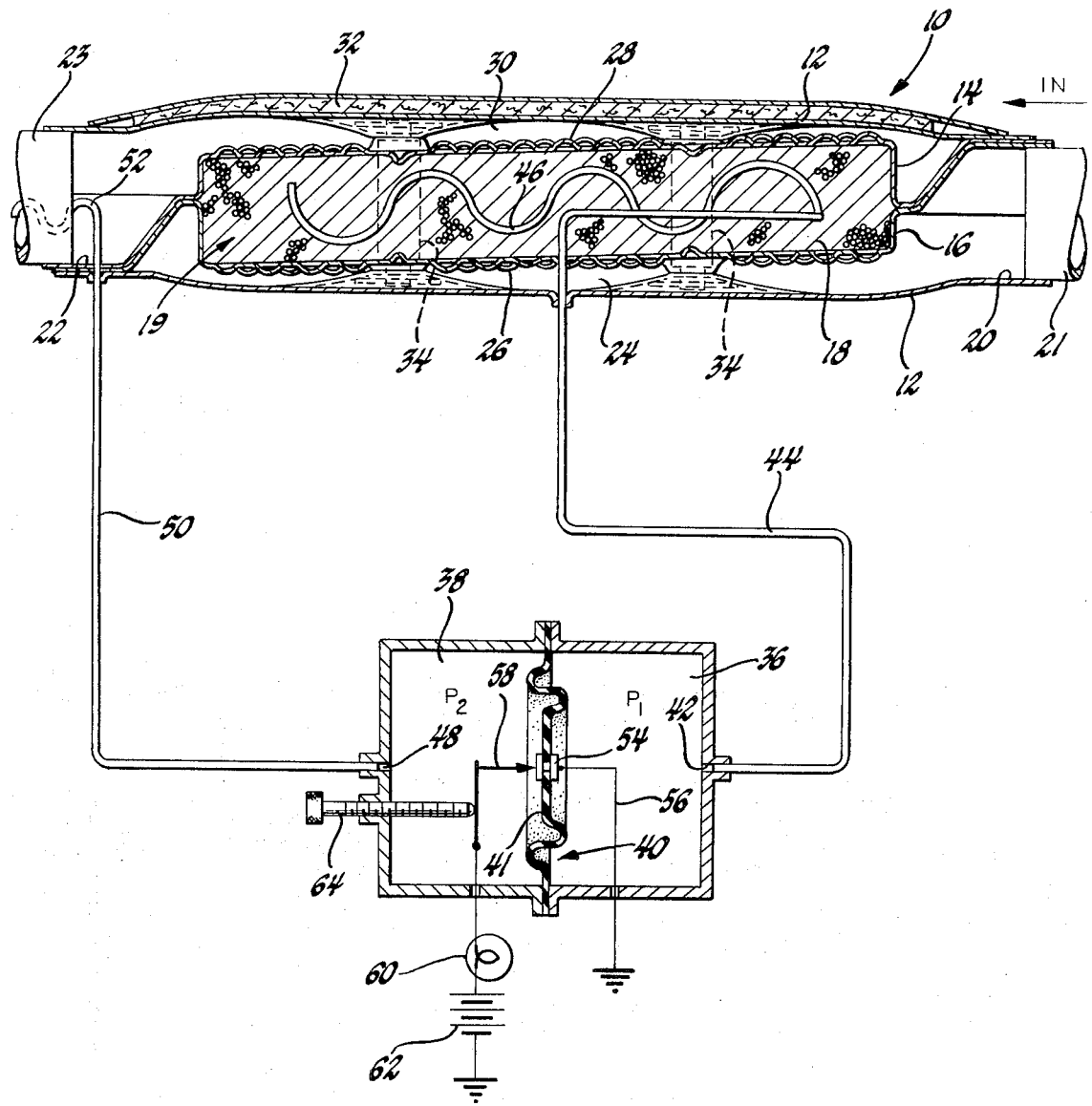
INVENTOR.
John W. Hile
BY
Peter P. Kozak
ATTORNEY

CATALYTIC CONVERTER MONITOR

This invention relates to the catalytic treatment of automotive exhaust gases from an internal combustion engine to convert the undesirable constituents of the exhaust gases to an innocuous form and, more particularly, to apparatus for continuously monitoring the activity of the catalytic treatment apparatus.

In automotive applications, a catalytic converter having a catalytic element positioned therein is placed in the engine exhaust stream such that exhaust gases from the engine pass into the converter and through the catalytic element which contains a catalytic material effective to oxidize CO and unburned hydrocarbons to $CO_2$ and water and/or reduce oxides of nitrogen to elemental oxygen and nitrogen before being released to the atmosphere.

Although, the nature of catalysts and of catalytically induced reactions is not fully understood, it is known that in order for the catalyst to first become effective, it must be heated to a temperature above a minimum activation temperature. This temperature varies with catalyst composition, however, as a general principle, for noble metal catalysts, i.e., catalysts containing such noble metals as platinum and palladium, virtually 100 percent activity is achieved at a temperature in the range of about 350° F to 450° F; and for non-noble metal catalysts, i.e., catalysts formed of transition metal oxides, a gradual increase in activity is observed from temperatures as low as about 250° F with the catalyst reaching 50 percent activity in the range of about 350° to 450° F for CO and 400° to 550° F for unburned hydrocarbons, and 100 percent activity for both constituents in the range of 600° to 750° F. Accordingly, it may be seen that the catalyst material within the converter must absorb an initial amount of heat from the sensible heat of the exhaust gases passing therethrough before reaching activation temperature at which point the catalytic reaction becomes self-sustaining. In addition, it is known that catalyst materials can be rendered inactive and thus ineffective in treating the engine exhaust gases by such factors as sustained exposure to excessively high temperatures, e.g., temperatures in excess of about 1700° F, "poisoning" of the catalyst by such elements as lead, phosphorus and sulphur often contained in commercially available fuels, and loss of catalytic material resulting from physical attrition of the catalyst.

Inoperability of a catalytic converter or loss in catalyst activity after a period of usage can be determined by periodically analyzing the exhaust gases to determine the presence of unreacted constituents or by physically and chemically examining a sample of the catalyst for physical damage, "poisoning," or change in structure resulting from sustained high temperature operation. However, such procedures are expensive and time-consuming and do not offer a continuous check on catalyst activity. Further such procedures are unattractive in that they require periodic removal of the vehicle from usage while the tests are performed. Accordingly, it may be seen that a system for continuously monitoring the activity of a catalytic converter which is mounted on the vehicle in combination with the converter and which includes means for indicating when the converter is inoperative or when the catalyst has suffered loss in activity and therefore requires replacement is highly desirable.

It is known that the oxidation and reduction reactions occurring in the presence of the catalyst are exothermic reactions, and it has been found that the liberated heats of reaction contribute in part to increasing the temperature of the catalyst itself but in large part to increasing the temperature of the treated gases exiting the catalytic converter. As a result, during normal operation of the converter it has been found that the temperature of the exiting gas is on the order of 200° to 250° F higher than the average temperature of the catalyst element. Conversely, it has been found that when the converter is inoperative either because the catalyst has not reached its activation temperature or because the catalyst has suffered loss in activity, the temperature of the exiting gas is lower than or equal to the average temperature of the catalyst element. Further, it has been found that when the catalyst suffers a gradual loss in activity, as a result of any of the above-mentioned factors or others, the amount of reaction heat liberated within the element gradually decreases and the temperature of exiting gas correspondingly decreases and begins to approach the average temperature of the catalyst element.

It is known in the prior art to use various temperature sensing means for determining the absolute temperature of the catalytic element. However, these systems are operative only to protect the catalyst from exposure to excessively high temperatures over a predetermined temperature. Since catalysts operate over a range of temperatures with various levels of activity, a measurement of the absolute element temperature has not been found to be an effective indication of catalyst activity.

Accordingly, it is the principal object of this invention to provide apparatus for continuously monitoring the activity of a catalytic converter which is operative to sense a positive differential temperature between the exiting gases and the catalytic element resulting from the liberated heats of the exothermic reactions occurring in the catalytic element and, conversely, a zero or negative differential temperature resulting from the absence of such heats of reaction, which accompanies the absence of catalytic activity, and to signal by means of appropriate indicating means such absence of catalytic activity.

It is a further object of this invention to provide apparatus for continuously monitoring the activity of a catalytic converter which is operative to indicate when the threshold activation temperature of the catalyst has been reached and the operation of the converter has become self-sustaining.

It is another object of this invention to provide a closed system for monitoring the activity of a catalytic converter which is adapted to be mounted on the vehicle in combination with the converter and which continuously monitors a differential temperature between the temperature of the catalytic element and the temperature of the exiting gases, rather than the absolute temperature of the element.

In the preferred embodiment of the invention, these and other objects are accomplished by providing an enclosed fluid pressure sensing system wherein the average temperature of the catalytic element is sensed and a fluid pressure proportional thereto is placed in opposition across a flexible diaphragm to a fluid pressure proportional to the temperature of the treated gases passing from the catalytic converter. The flexible diaphragm carries indicator means normally operative when the temperature of the exiting gases is less than or equal to the average temperature of the element indicating that the converter is inactive such that when the converter is operative and the temperature of the exiting gases is higher than the average temperature of the catalytic element, the fluid pressure proportional to the exiting gas temperature is sufficient to disengage the indicator means.

In another embodiment, the diaphragm and indicator means are so arranged that the indicator remains operative until the temperature differential between the exiting exhaust gases and the catalytic element exceeds a predetermined temperature differential such that when the catalytic activity falls below a predetermined level of activity the fluid pressure proportional to the temperature of the exiting exhaust gases is insufficient to prevent return of the indicator means to its operative position indicating that the converter is operating below a predetermined level of activity.

Other objects and advantages of this invention will become apparent from the following detailed description of the invention, reference being had to the accompanying drawing which is a cross-sectional illustration of the monitoring apparatus embodying the invention as arranged in combination with a catalytic converter.

It will be recognized by those skilled in the art that the catalytic converter monitor hereinafter disclosed and described in detail is not limited to use with a particular converter design and, accordingly, a generalized type of catalytic converter 10 to which the invention is applicable is shown in the accompanying FIGURE as including an outer housing 12 having mounted therein an upper catalyst retaining plate 14 and a lower catalyst retaining plate 16 which contain a quantity of catalytic material 18 disposed therebetween to define a catalytic element 19. The housing 12 in combination with the catalyst retaining plates 14 and 16 define an exhaust gas inlet 20 adapted to receive an exhaust gas inlet pipe 21 and an exhaust gas outlet 22 adapted to receive an exhaust gas outlet pipe 23 such that the catalytic converter 10 is placed instream with the exhaust gases passing from the engine to the atmosphere. The catalytic converter 10 is further shown as including a layer of insulation 32 above the housing 12 which protects the underbody of the vehicle from the heat of the converter and support studs 34 extending between the housing plates 12 through the catalyst element 19 to provide structural support for the converter. In operation, exhaust gases passing into the converter through the inlet 20 pass into an inlet plenum 24 and then upwardly through louvers or perforations 26 in the lower catalyst retaining plate 16 to the catalyst material 18 wherein the oxidation and reduction reactions take place. The treated gases then pass through louvers or perforations 28 in the upper catalyst retaining plate 14 and into an outlet plenum 30 to be exhausted through the exhaust gas outlet 22.

The catalytic converter monitoring apparatus embodying the invention includes a first chamber 36. Opposed to the first chamber 36 is a second chamber 38. Separating the opposed chambers is a flexible diaphragm 40 which extends circumferentially across the chambers and provides a seal therebetween. Communicating with the first chamber 36 through an orifice 42 is a first closed end tube 44 having a portion thereof 46 disposed within the catalytic element 19 and surrounded by the catalyst material 18. Communicating with the second chamber 38 through an orifice 48 is a second closed end tube 50 having a portion thereof 52 disposed in the exhaust gas outlet 22. Both tubes 44 and 50 and the first and second chambers 36 and 38, respectively, are filled with a thermally expansible fluid which may be an appropriate gas, such as air, or a liquid such that when the catalytic converter is inactive and at ambient temperature, pressure $P_1$ in the first chamber 36 equals pressure $P_2$ in the second chamber 38 and the diaphragm 40 is in a centered position.

The closed end tube portion 46 disposed in the catalytic material 18 is arranged so as to be responsive to the average temperature of the element. That is, it is known that temperatures throughout the element vary substantially due to differential gas flow through the element, radiation effects associated with the catalyst retaining plates 14 and 16, and regions of high localized activity. In the preferred form, the tube portion 46 is formed in a serpentine fashion along the length of the catalytic element. In this manner the average temperature of the bed can be accurately sensed as opposed to the use of such sensing means as thermocouples, extension rod dilatometers, and gas filled bulbs which are effective only in sensing a localized temperature within the element which often does not accurately reflect the average temperature of the element. Similarly, the closed end tube portion 52 of the second tube 50 is arranged in the exhaust gas outlet 22 so as to be responsive to the temperature of the treated gases passing therethrough.

The flexible diaphragm 40 has a movable portion 41 which has associated therewith indicator means including a metallic contact 54, a ground lead 56 for grounding the contact 54, and a switch contact 58 which is connected through an incandescent signal lamp 60 to one side of a standard vehicle battery 62 which is grounded on the other side. The position of the switch contact is adjustable by means of an adjustment screw 64. It may be seen that when the switch contact 58 is in contact with the contact 54 mounted on and carried by the movable diaphragm portion 41, a circuit is completed which lights the signal lamp 60. The signal lamp 60 may be conveniently placed on the dashboard of the vehicle as a warning light to the driver.

As previously mentioned, when the converter 10 is inoperative and at ambient temperature, as before vehicle ignition, the temperature of the catalytic element and that of the atmosphere in the exhaust outlet 22 will be equal. Accordingly, the pressure $P_2$ in the second chamber 38 and the pressure $P_1$ in the first chamber 36, which are responsive to and proportional to these temperatures, for example, in accordance with the Ideal Gas Law for gas filled tubes, will also be equal and the diaphragm 40 will be in its centered position, as shown, with the switch contact 58 contacting the contact 54 whereby the signal lamp 60 is activated indicating that the converter is inoperative. It will be recognized that the signal lamp 60 may be connected through the ignition system such that the lamp is activated only on ignition.

In operation, on initial start-up of the vehicle exhaust gases begin flowing through the converter with the catalyst material being heated by the heat of the exhaust gases and with no reactions occurring since the catalyst is below activation temperature. As a result, the pressure $P_1$ in chamber 36 begins to increase as the average temperature of the element increases with the pressure $P_2$ in chamber 38 increasing at a slower rate due to the abstraction of heat by the catalyst from the exhaust gases passing through the converter. This pressure differential between chambers 36 and 38 acts to maintain the movable diaphragm portion 41 in its centered position or bulged slightly into chamber 38 such that electrical contact is maintained between the contacts 58 and 54 and the lamp 60 remains lighted indicating that the converter has not yet become active.

Once the catalyst has reached activation temperature, the temperature of the gases passing through the outlet 22 increases over the average temperature of the catalytic element due to the heat of the exothermic reactions occurring therein. As a result, the fluid pressure in tube 50 increases over that in tube 44 and, correspondingly, pressure $P_2$ becomes greater than pressure $P_1$. This fluid pressure differential is then operative to move and hold the movable diaphragm portion 41 inwardly toward chamber 36 with the diaphragm carrying the contact 54 out of contact with the contact 58 thus deactivating the signal lamp 60 and thus indicating that the converter is operative.

If during operation, the catalyst should suffer a total loss in activity, the temperature of the exiting exhaust gases would quickly decrease to a temperature equal to or less than the average temperature of the element. The monitoring system would then respond with pressure $P_2$ becoming equal to or less than pressure $P_1$ and, as a result, the diaphragm would move back to its centered position activating the signal lamp 60 to indicate inactivity of the catalytic converter.

In accordance with the above-described operation of the invention, it may be deemed desirable that the indicator warning light be extinguished on start-up only after the converter has reached a predetermined level of activity, e.g., 50 percent efficiency, as opposed to the point of initial catalyst activity. Likewise, it may be deemed desirable that the indicator warning light be activated on a corresponding predetermined loss in catalyst activity, e.g., a drop in activity from 100 percent efficiency to 50 percent efficiency. Accordingly, the monitoring apparatus is provided with an adjustment screw 64 for adjusting the position of contact 58.

As above described, when the catalytic converter is operating normally, the temperature differential between the temperature of the exiting exhaust gases and the average temperature of the catalytic element will be on the order of 200° – 250° F. However, at a lower level of efficiency this temperature differential will be smaller, for example at 50 percent efficiency the differential will be on the order of 100° – 125° F, and will continue to decrease as the efficiency of the converter decreases until a zero or negative temperature differential is observed on total loss of activity. Accordingly, the switch contact 58 may be adjusted such that the diaphragm 40 carrying the contact 54 is moved out of contact with the switch contact 58 only when the pressure differential, $P_2 - P_1$, exceeds a predetermined pressure differential proportional to a predetermined temperature differential between the exiting exhaust gases and the catalytic element which, in turn, is related to a desired level of catalyst activity. Further, should the converter suffer a loss in activity during operation, the indicator warning light will be operative when the catalyst activity falls below this predetermined level of activity.

Although the invention has been described in terms of certain specific embodiments, it will be recognized by those skilled in the art that other forms may be adopted within the scope of the invention.

Thus, having described the invention, what is claimed is:

1. Thermal response apparatus for monitoring the activity of a catalytic converter that includes a housing, a catalytic element disposed within said housing, an inlet for directing exhaust gases into said housing and through said catalytic element wherein the gases are treated, and an outlet for directing the treated gases out of said housing, said thermal responsive apparatus comprising, first and second opposed chambers, flexible diaphragm means sealingly separating said opposed chambers into two substantially equal chambers, said diaphragm being movable in response to a differential fluid pressure between said chambers, a first closed end tube communicating with said first chamber and having a portion thereof disposed within and along the length of said catalytic element and arranged so as to be responsive to an average of the temperatures of exhaust gases directed through the length of said catalytic element, a second closed end tube communicating with said second chamber and having a portion thereof disposed in said outlet and arranged so as to be responsive to the temperature of the gases passing through said outlet, said chambers and said tubes being filled with a thermally expansible fluid, a grounded contact mounted on said flexible diaphragm means, an adjustable contact means opposite said grounded contact that is adapted to contact said grounded contact when the fluid pressure differential between said second chamber and said first chamber is below a predetermined fluid pressure differential to close a circuit, and being further adapted to move away from said grounded contact to open the circuit when said fluid pressure differential in said second chamber is greater than in said first chamber, to thereby open the circuit, and an indicator lamp in said circuit adapted to be operative when said circuit is closed indicating that said element is operating below a predetermined level of activity and further adapted to be inoperative when said circuit is open.

* * * * *